(12) United States Patent
Dong et al.

(10) Patent No.: US 11,061,788 B2
(45) Date of Patent: Jul. 13, 2021

(54) STORAGE MANAGEMENT METHOD, ELECTRONIC DEVICE, AND COMPUTER PROGRAM PRODUCT

(71) Applicant: EMC IP Holding Company LLC, Hopkinton, MA (US)

(72) Inventors: Jibing Dong, Beijing (CN); Geng Han, Beijing (CN); Hongpo Gao, Beijing (CN); Jianbin Kang, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/825,073

(22) Filed: Mar. 20, 2020

(65) Prior Publication Data

US 2020/0349038 A1 Nov. 5, 2020

(30) Foreign Application Priority Data

Apr. 30, 2019 (CN) .......................... 201910359618.X (51) Int. Cl.
*G06F 11/07* (2006.01)
*G06F 11/20* (2006.01)

(52) U.S. Cl.
CPC ...... *G06F 11/2094* (2013.01); *G06F 2201/82* (2013.01)

(58) Field of Classification Search
CPC ............... G06F 11/2094; G06F 11/108; G06F 11/1084; G06F 11/1088; G06F 11/1092; G06F 11/1096
USPC ................................................. 714/6.22, 6.24
See application file for complete search history.

(56) References Cited

U.S. PATENT DOCUMENTS

| | | | |
|---|---|---|---|
| 8,839,028 B1 * | 9/2014 | Polia | G06F 11/1088 714/6.24 |
| 2003/0237019 A1 * | 12/2003 | Kleiman | G06F 11/1092 714/6.32 |
| 2020/0341873 A1 * | 10/2020 | Dong | G11B 20/1889 |

* cited by examiner

*Primary Examiner* — Chae M Ko
(74) *Attorney, Agent, or Firm* — BainwoodHuang (57) ABSTRACT

Storage management techniques involve, in response to a request to write data to a redundant array of independent disks (RAID), determining whether there is an offline disk in a plurality of storage disks constituting the RAID, the RAID comprising a plurality of stripes, each of the plurality of stripes comprising a plurality of storage blocks divided from the plurality of storage disks; in response to determining that there is an offline disk in the plurality of storage disks, selecting a target stripe from the plurality of stripes, the target stripe having a storage block allocated from the offline disk for storing parity information; and writing the data to the target stripe. In this way, the performance of data write can be improved in presence of an offline disk. In addition, the performance of subsequent data read can also be improved potentially.

18 Claims, 7 Drawing Sheets

STORAGE MANAGEMENT METHOD, ELECTRONIC DEVICE, AND COMPUTER PROGRAM PRODUCT

CROSS REFERENCE TO RELATED APPLICATION

This application claims priority to Chinese Patent Application No. CN201910359618.X, on file at the China National Intellectual Property Administration (CNIPA), having a filing date of Apr. 30, 2019, and having "STORAGE MANAGEMENT METHOD, ELECTRONIC DEVICE, AND COMPUTER PROGRAM PRODUCT" as a title, the contents and teachings of which are herein incorporated by reference in their entirety.

FIELD

Embodiments of the present disclosure generally relate to a computer system or a storage system and more particularly, to a method of storage management, an electronic device, and a computer program product.

BACKGROUND

In a redundant array of independent disks (RAID)-based storage system, if a storage disk in the RAID is removed or failed, the storage system will send a corresponding event notification to a backend to cause the backend to update storage disk information. Thereafter, the backend can send an event notification to a RAID module to indicate that the storage disk is offline. An offline disk is unavailable for input/output (I/O) access. The data redundancy and resiliency mechanisms of the RAID enable I/O access to data even when there is some offline disk. However, in the conventional solution, the presence of the offline disk may adversely affect the I/O access speed and resource consumption.

SUMMARY

Embodiments of the present disclosure relate to a solution for storage management.

In a first aspect of the present disclosure, there is provided a method of storage management. The method includes in response to a request to write data to a redundant array of independent disks (RAID), determining whether there is an offline disk in a plurality of storage disks constituting the RAID, the RAID including a plurality of stripes, each of the plurality of stripes including a plurality of storage blocks divided from the plurality of storage disks; in response to determining that there is an offline disk in the plurality of storage disks, selecting a target stripe from the plurality of stripes, the target stripe having a storage block allocated from the offline disk for storing parity information; and writing the data to the target stripe.

In a second aspect of the present disclosure, there is provided an electronic device. The electronic device includes at least one processor; and at least one memory storing computer program instructions, the at least one memory and the computer program instructions being configured, with the at least one processor, to cause the electronic device to perform acts including: in response to a request to write data to a redundant array of independent disks (RAID), determining whether there is an offline disk in a plurality of storage disks constituting the RAID, the RAID including a plurality of stripes each including a plurality of storage blocks divided from the plurality of storage disks; in response to determining that there is an offline disk in the plurality of storage disks, selecting a target stripe from the plurality of stripes, the target stripe having a storage block allocated from the offline disk for storing parity information; and writing the data to the target stripe.

In a third aspect of the present disclosure, there is provided a computer program product. The computer program product is tangibly stored on a non-transitory computer readable medium and includes machine executable instruction the machine executable instructions, when executed, causing a device to, in response to a request to write data to a redundant array of independent disks (RAID), determine whether there is an offline disk in a plurality of storage disks constituting the RAID, the RAID including a plurality of stripes each including a plurality of storage blocks divided from the plurality of storage disks; in response to determining that there is an offline disk in the plurality of storage disks, select a target stripe from the plurality of stripes, the target stripe having a storage block allocated from the offline disk for storing parity information; and write the data to the target stripe.

It is to be understood that the content of the present disclosure is not intended to limit key features or essential features of embodiments of the present disclosure. Other features of the present disclosure will be readily understood from the following detailed description.

BRIEF DESCRIPTION OF THE DRAWINGS

The above and other objectives, features, and advantages of example embodiments of the present disclosure will become more apparent through the following detailed description with reference to the accompanying drawings. Several example embodiments of the present disclosure will be illustrated in the drawings by way of example without suggesting any limitation, in which.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles and spirits of the present disclosure will now be described with reference to several example embodiments illustrated in the drawings. It would be appreciated that description of those embodiments is merely for purpose of enabling those skilled in the art to better understand and further implement the present disclosure without suggesting any limitation to the scope disclosed herein in any manner.

In a RAID-based storage system, a stripe of a RAID includes storage blocks from a plurality of storage disks. Therefore, if one or more of a plurality of storage disks become offline and inaccessible due to some reasons such as a failure or being pulled out, a part of the data/parity information of a stripe established based on the storage disk will be unavailable to be accessed. Depending on the data redundancy and resiliency mechanisms of the RAID, data can still be written to the stripe or the remaining stored data can still be read therefrom. However, more computing resources, more disk access, and/or longer processing time may be consumed than a normal stripe that is not related to offline disks. In order to better understand the process of data read and write to/from the storage system when a disk is offline, the basic architecture of the RAID-based storage system is first introduced below.

Figure 1:
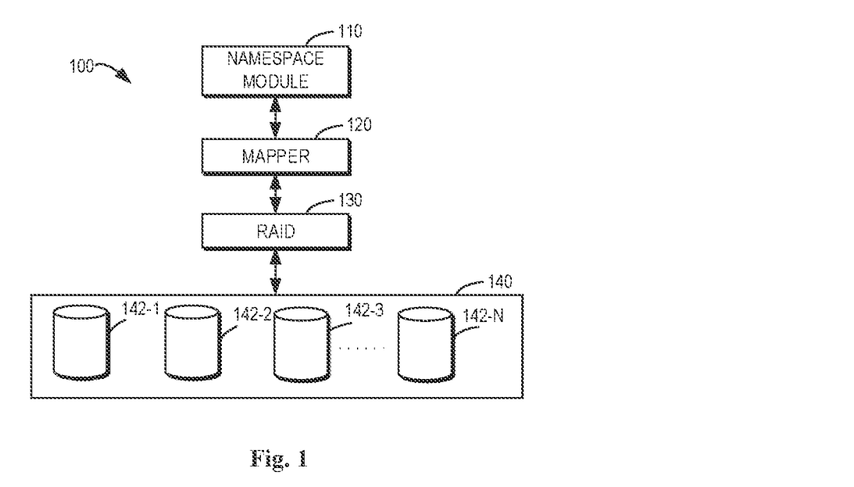
FIG. 1 is a diagram illustrating an example storage system in which embodiments of the present disclosure can be implemented.

FIG. 1 is a diagram illustrating an example storage system 100 in which embodiments of the present disclosure may be implemented. As shown in FIG. 1, the storage system 100 includes a hardware storage pool 140 including a plurality of storage disks 142-1, 142-2, 142-3, . . . , 142-N (where N is an integer greater than or equal to 1) to provide a physical storage space for the storage system 100. For ease of discussion, these storage disks are sometimes collectively or individually referred to as storage disks 142. The storage disks 142 may include devices of various types with storage functions including, but not limited to, a hard disk (HDD), a solid status disk (SSD), a removable disk, a compact disk (CD), a laser disk, an optical disk, and a digital versatile disc (DVD), Floppy, Blu-ray Disc, Serial Attached Small Computer System Interface (SCSI) Storage Disk (SAS), Serial Advanced Technology Attachment (SATA) Storage Disk, any other magnetic storage device, and any other optical storage device, or any combination thereof.

A RAID 130 in the storage system 100 is built on a plurality of storage disks 142 to organize physical storage space of the storage disk 142 using RAID algorithms. The RAID 130 provides a flat physical address space to a mapper 120 of the storage space 100. The mapper 120 is configured to manage mapping between physical addresses and logical addresses of the storage system 100. The mapper 120 provides a flat linear logical address space to a namespace module 110. The namespace module 110 utilizes the logical address space provided by the mapper and invokes an application program interface (API) of the mapper 120 to obtain logical-to-physical mapping. Upon an I/O operation performed on the storage system 100, an I/O request is received from a user by the namespace module 110 and sent to the mapper 120. The mapper 120 looks up a physical address of data to which the I/O request is directed (an address to which the data is written or an address from which the data is read), and initiates an I/O to the RAID 130 to perform the actual I/O operation from the RAID 130 to the storage disks at the back end.

It would be appreciated that FIG. 1 only schematically illustrates units, modules, or components that are related to embodiments of the present disclosure in the storage system 100. The various components shown in FIG. 1 are merely shown as one example storage system management architecture. In other RAID-based storage systems, there may be other architectures, other units, modules, or components for other functions, and the like. Thus, embodiments of the present disclosure are not limited to the specific devices, units, modules or components depicted in FIG. 1, but are generally applicable to any RAID-based storage system. The various components shown in FIG. 1 (other than the hardware storage disks 142) can be implemented in a single or multiple computing devices.

Figure 2:
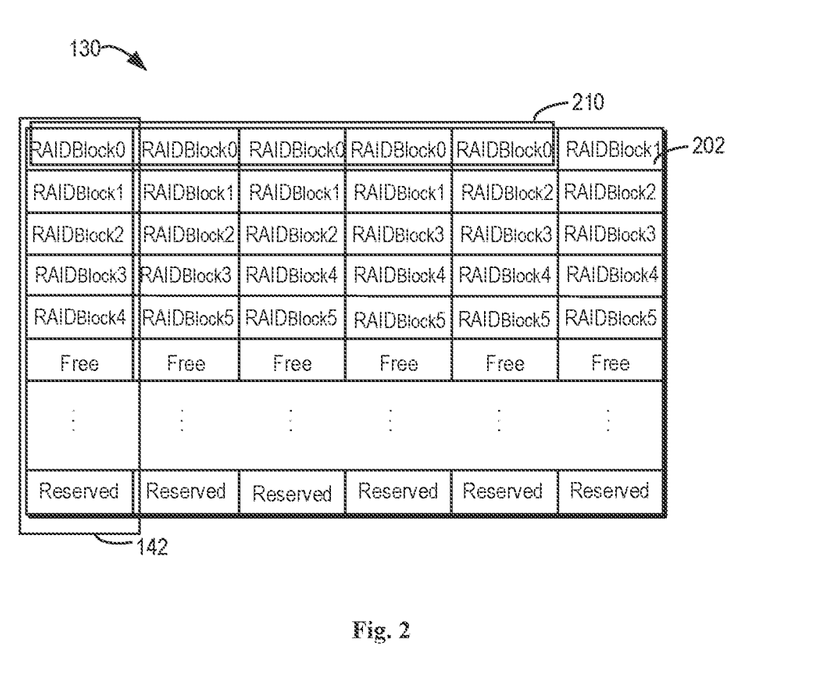
FIG. 2 is a schematic diagram illustrating an example structure of a RAID according to an embodiment of the present disclosure.

In RAID-based storage systems, various RAID algorithms can be utilized to organize physical storage disks 142, including traditional RAID algorithms and an architecture that is referred to as RAID 2.0 currently. To better understand the RAID-based storage systems, FIG. 2 shows an example structure of the RAID 130. As shown in FIG. 2, a storage disk 142 is divided into a plurality of disk extents or a plurality of disk slices 202. Such division can be a logical division. The size of the disk extent 202 depends on the size and division of storage disks. In some examples, extents 202 are of gigabytes in size. Of course, other sizes are also possible depending on requirements for actual layouts.

The RAID 130 is built in units of disk extents 202. In some dynamically allocated storage systems, when the RAID 130 is initially created, all disk extents are free. As data is written to the RAID and the RAID capacity is found insufficient, the RAID 130 will select a number of disk extents 202 from different storage disks 142 using some algorithm and combine the disk extents 202 into a RAID block 210 of the RAID 130. Such RAID block 210 may be regarded as a small RAID because the I/O access and management of the RAID block 210 is similar to a normal RAID.

The disk extents 202 may be selected from a number of storage disks 142 by any suitable algorithm, such as a Round-Robin distribution algorithm, a weighted Round-Robin distribution algorithm, or the like. The number of disk extents included in each RAID block 210 depends on a RAID type, in order to provide different levels of data redundancy and resiliency. RAID types include RAID 2, RAID 3, RAID 4, RAID 5, RAID 6, RAID 7, RAID 10, and so on. In FIG. 2 and in the following, example embodiments of the present disclosure are discussed by taking the type of RAID 5 as an example for purposes of illustration. However, it would be appreciated that example embodiments of the present disclosure may be similarly applied to RAID of any other type.

In FIG. 2, each RAID block 210 includes five disk extents from different storage disks 142, depending on type of RAID 5. As mentioned above, new RAID blocks 210 can be continuously allocated according to needs by data writes, such that the capacity of the RAID 130 is dynamically grown. Five allocated RAID blocks 210 (i.e., RAIDBlock0 to RAIDBlock5) are shown in FIG. 2. In FIG. 2, each disk extent 202 is marked with "RAIDBlock0", "RAIDBlock1", "RAIDBlock2", "RAIDBlock3", "RAIDBlock4", or "RAIDBlock5" to illustrate to which RAID block the disk extent is allocated. The disk extents 202 in each storage disk 142 that are not selected as RAID blocks are considered to be free disk extents 202, marked as "free".

In some embodiments, one or more disk extents 202 (marked "reserved") in each storage disk 142 may be reserved for data rebuild in order to deal with disk failure. For example, when a storage disk 142 fails, all the disk extents 202 in the storage disk 142 will be marked as failed, which means that the RAID blocks 210 established from these disk extents 202 will be affected. The storage system 100 can start a rebuild process to select the reserved disk extents 202 to replace the failed ones in the RAID block 210 and reconstruct the data/information in the failed disk extents to the reserved disk extents 202. According to the rebuild algorithms, the rebuild process may be initiated for a period of time after the disk is failed. The scope of the embodiments of the present disclosure is not limited in this regard.

Figure 3:
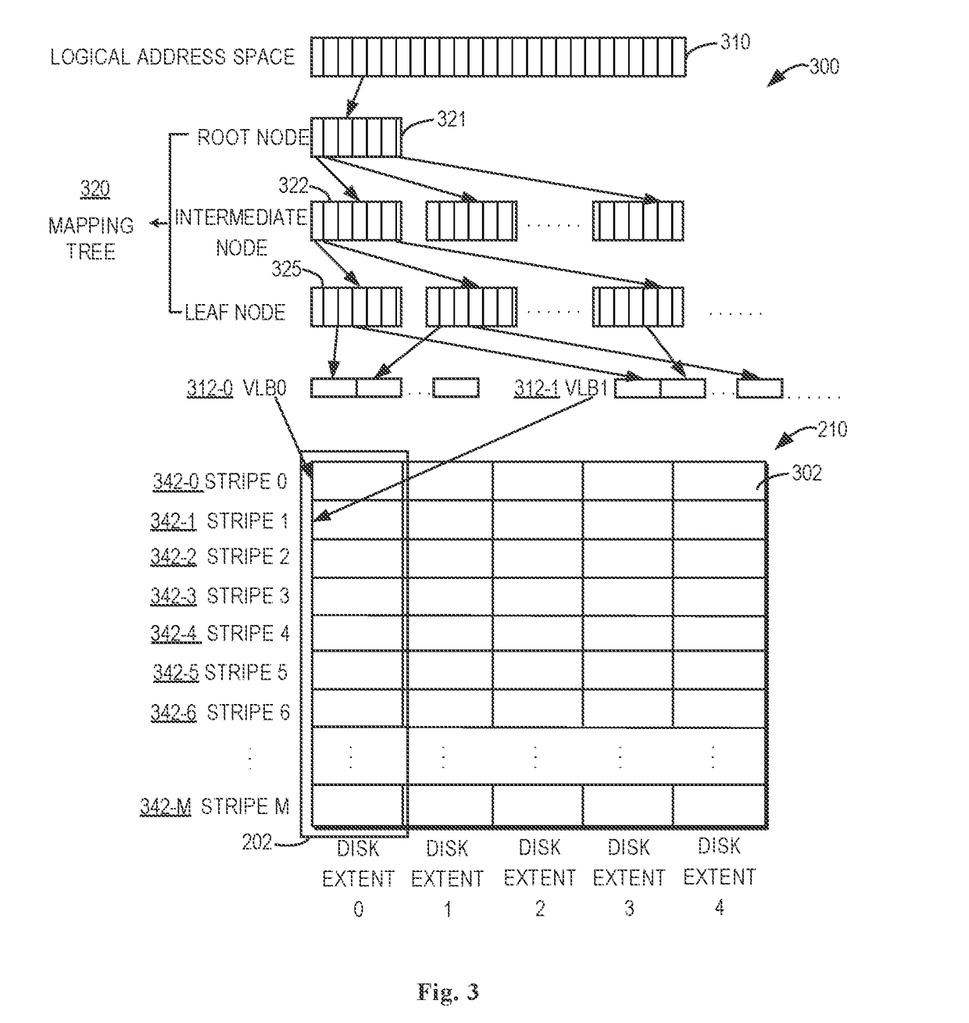
FIG. 3 is a schematic diagram illustrating an example logical-physical mapping in a storage system in accordance with an embodiment of the present disclosure.

As described above, the mapper 120 provides the logical storage space to upper layers (e.g., the namespace module 110) and maps the logical storage space to the physical storage space of the RAID 130. FIG. 3 shows an example logical-physical mapping 300 in the mapper 120. As shown in FIG. 3, the logical address space 130 consists of a plurality of pages each having a same size, such as a size of 4 KB. Of course, other page sizes are also possible. The mapper 120 can utilize a B+ tree as a mapping tree 320 to reference to pages in the logical address space at a granularity of 4 KB pages. FIG. 3 shows a mapping tree 320 of an example three level B+ tree. It would be appreciated that tree structures with other levels or other types of data structures may also be used to implement the mapping.

As shown, the mapping tree 320 includes a root node 321, a plurality of intermediate nodes 322, and a plurality of leaf nodes 325, each node 321, 322, 325 having a plurality of entries. Each entry corresponds to a corresponding pointer for pointing to an entry of a next level. The entries in the leaf node 325 point to pages in the logical address space. In one example, each node may include 512 pointers, each of which points to an entry or page of a next level. Of course, the number of pointers here is only an example, and other numbers of pointers are also possible. In some implementations, multiple pages of a logical address space are packaged together within larger unit virtual blocks, which are referred to as virtual large blocks (VLBs) 312-0, 312-1, and so on (sometimes collectively or individually referred to as VLBs 312 or virtual blocks 312). Each VLB 312 is mapped to a unit physical block of the RAID 130.

The physical storage space of the RAID 130 is divided into multiple stripes, each of which is of the same size. The stripes can also be referred to as physical large blocks (PLBs). The size of the stripes may be, for example, 2 megabytes (MB), though other suitable sizes are also possible. In some examples, the size of stripes may be an integral multiple of a single page size in the VLB, such as an integral multiple of 4 KB.

FIG. 3 illustrates striping of a single RAID block 210 in the RAID 130 where the type of RAID 5 is still used as an example. As shown, the RAID block 210 includes a plurality of stripes, i.e., stripe 0 342-0 to stripe M 342-M (sometimes collectively or individually referred to as stripes 342), where M is an integer greater than or equal to one. Each stripe 342 includes a plurality of respective storage blocks 302 across a plurality of disk extents 202 (i.e., disk extent 0 to disk extent 4) of the plurality of storage disks 142. In other words, each stripe 342 includes a plurality of respective storage blocks 302 from a plurality of storage disks 142. This distribution of storage space across storage disks can prevent data from being lost during failure of individual storage disks. The mapper 120 may perform the logical-physical mapping in stripes. Each virtual block VLB 312 is mapped to a stripe 342. For example, FIG. 3 shows that a VLB 312-0 is mapped to a stripe 342-0 and a VLB 312-1 is mapped to a stripe 342-1, and so on.

In performing a data write operation, data to be written is first cached into a cache device (not shown) and flushed to the mapper 120 according to a predetermined data flushing mechanism. The mapper 120 then sets a mapping relationship between stripes to which the data is to be written and VLBs in the mapping tree 320, and writes the data to a stripe 342 in the RAID block 210. Since the mapper 120 is a logic-based mapping system, when data in the physical storage space is overwritten, only the pointer of the corresponding entry of the leaf node 325 needs to be updated to point to a new VLB (i.e., a VLB mapped to a new stripe).

It would be understood that embodiments of the present disclosure are not limited to the specific numerical values and specific data structures described above. In other embodiments, the size and granularity of the above logical address space and the size and partition granularity of the physical address space may be set to any other appropriate values, and the mapper 120 may use other suitable data structures to maintain the mapping between logical addresses and physical addresses.

Figure 4:
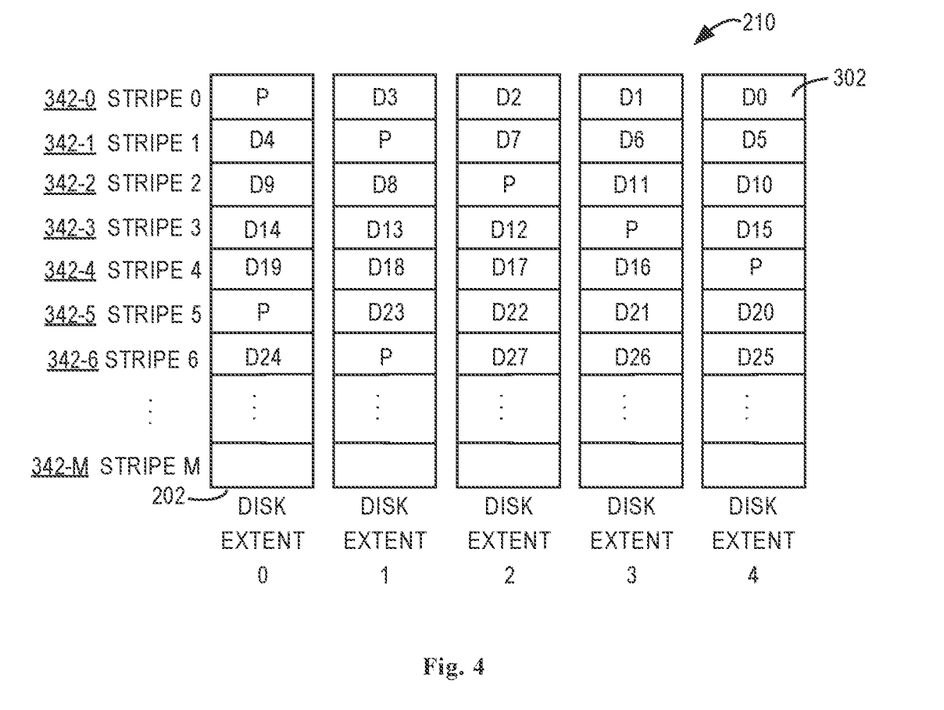
FIG. 4 is a schematic diagram illustrating a layout of stripes in a RAID block in accordance with an embodiment of the present disclosure.

Depending on the RAID type, various stripes 342 of the RAID blocks 210 in the RAID 130 may have different layouts. FIG. 4 further illustrates a layout of stripes 342 in a RAID block 210 in the RAID 130. A plurality of storage blocks 302 of each stripe 342 are respectively allocated for storing data and parity information. In FIG. 4, storage blocks allocated for storing data in each stripe 342 are marked with "D" (the storage blocks in the stripe used for storing data are numbered correspondingly), and storage blocks allocated for storing parity information are marked with "P." The number of storage blocks storing data and the number of storage blocks storing parity information in each stripe 342 depend on the RAID type. In a type of RAID 5-based stripe 342 shown in FIG. 4, four storage blocks 302 are used to store data, and a further storage block 302 is used to store parity information.

In some embodiments, the locations of the storage blocks 302 for storing parity information in the different stripes 342 of the RAID block 210 may circulate among different storage disks 142 (i.e., among the different disk extents 202 that make up the RAID block 210) in a cycle manner. For example, in FIG. 4, a storage block 302 for storing parity information in the stripe 342-0 is located in the disk extent 0, a storage block 302 for storing parity information in the stripe 342-1 is located in another disk extent 1, a storage block 302 for storing parity information in the stripe 342-2 is located in a further different disk extent 2, and so on. As data is written, the store data and corresponding parity information are stored the storage blocks in the stripe 342 in a similar layout.

It would be appreciated that FIG. 4 only illustrates a layout of stripes based on the type of RAID 5. Stripes of other types of RAID may have other layouts. In some embodiments, in a RAID built based on other RAID types, there may be two or more storage blocks in each stripe for storing parity information. For example, in a RAID 6 type based RAID, each stripe includes six storage blocks, four of which are used to store data and two of which are used to store parity information.

During operation of the storage system 100, if a certain storage disk 142 is offline due to a failure or being pulled out, all disk extents 202 of that storage disk 142 are marked as failed. The corresponding RAID block 210 including those disk extents will enter a degraded status. In this status, I/O access (read and write) for each stripe 342 in the RAID block 210 will be affected due to the presence of the failed disk extents. The read and/or write operations from and/or to the stripe 342 in the case of the degraded RAID block 210 will be described below with reference to the examples of FIGS. 5A to 5D. In the examples of FIGS. 5A to 5D, the layout of the storage blocks for data and parity information in the stripe 342 is similar to that in the stripes 342-0 in FIG. 4 for ease of explanation.

Figure 5A:
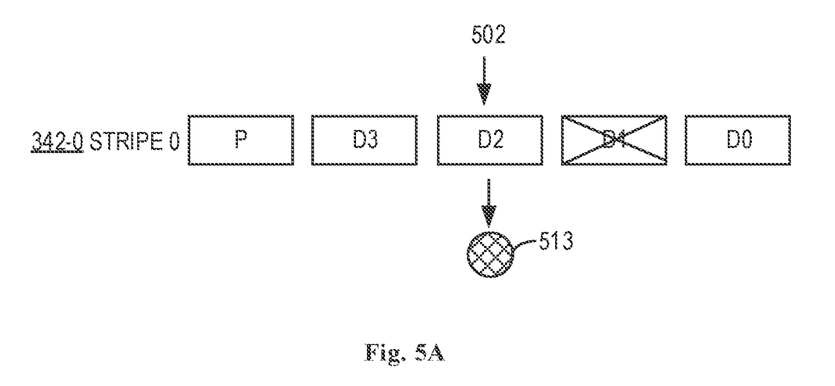
FIGS. 5A-5D are schematic diagrams illustrating data read and write operations in stripes of a RAID under a degraded status in accordance with an embodiment of the present disclosure.
Figure 5B:
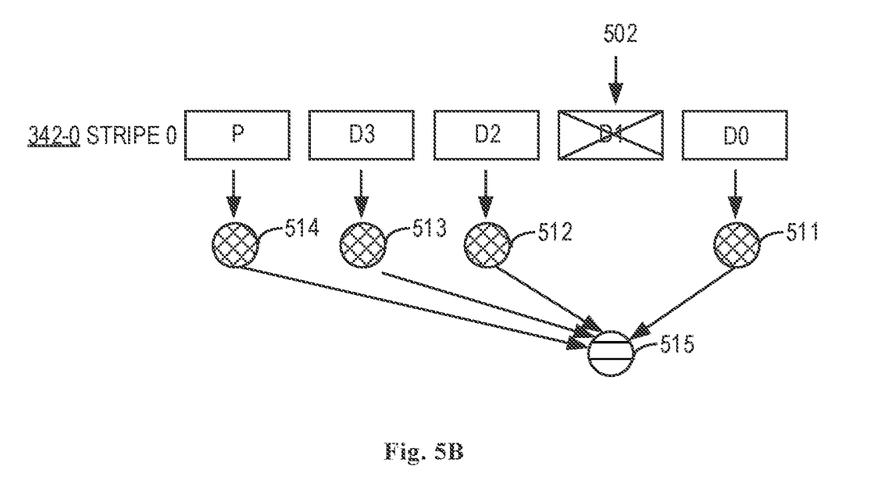

The examples of FIGS. 5A and 5B are related to read operations. In these examples, it is assumed that the storage disk 142 in which the disk extent 3 of the RAID block 210 in FIG. 4 is located is offline, and the disk extent 3 is marked as failed. This will affect the RAID block 210 that is formed from the disk extent 3, in particular the stripes 342 consisting of individual storage blocks 302 of the disk extent 3 in the RAID block 210. Therefore, the storage block D1, which is used for storing data in the stripe 342-0, is now in a failed status (or a degraded status). In FIG. 5A, if the storage system 100 receives a read request for data in the storage block D2 of the stripe 342, since the storage disk 142 where the storage block D2 is located is still in normal operating, data 513 in the storage block D2 can be directly read. For example, the mapper 120 can send, via the RAID 130, an I/O read request directly to the disk extent 2 where the storage block D2 is located.

Similarly, if the read request 502 is a request for the storage blocks D3 and D0, data in these storage blocks can also be directly retrieved. However, as shown in the example of FIG. 5B, if the read request 502 is to read the data in the storage block D1, it is required to first read data 511 to 513 and parity information 514 from the storage blocks D0, D2, D3, and P respectively and reconstruct data 515 in the storage block D1 based on the data 511 to 513 and the parity information 514. For example, depending on the parity algorithm used in the stripe, the data 511 to 513 and the parity information 514 may be processed, for example, using an exclusive OR operation or other algorithms to determine the data 515 in the storage block D1. This leads to more data reads and calculations within the same stripe, resulting in more I/O bandwidth consumption and computational consumption.

Figure 5C:
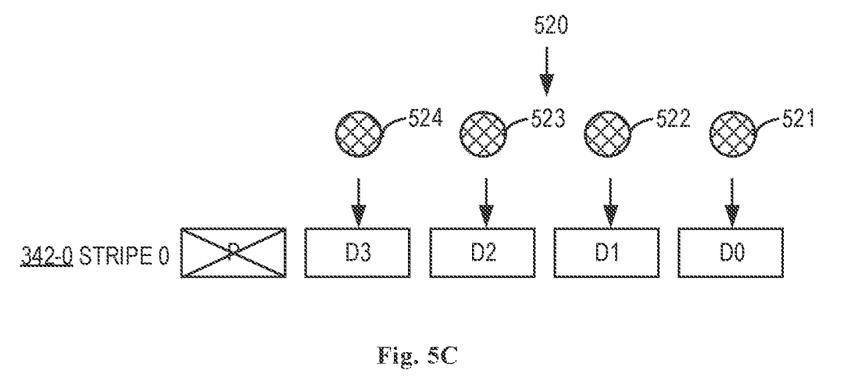
Figure 5D:
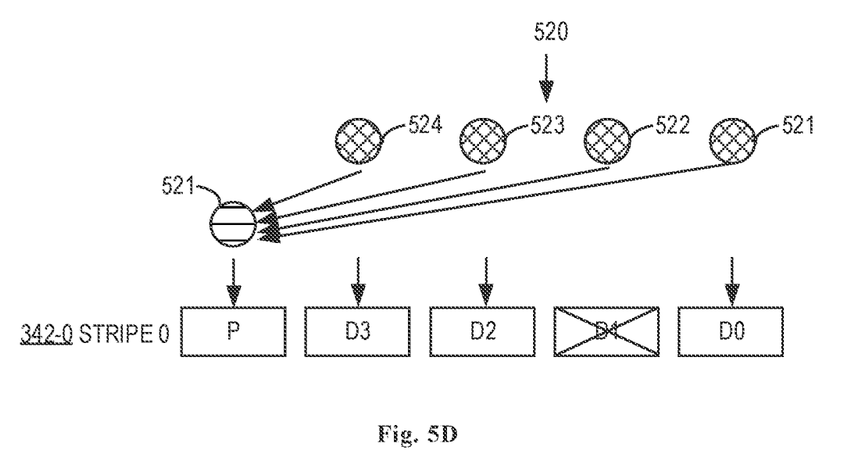

FIGS. 5C and 5D further illustrate write operations for the stripe 342-0 in the degraded RAID block 210. In the storage system 100, data write is usually performed in units of stripes. In the example of FIG. 5C, it is assumed that the storage disk 142 in which the disk extent 0 of the RAID block 210 in FIG. 4 is located is offline, and the disk extent 0 is marked as failed. This will affect the RAID block 210 that is formed from the disk extent 0, in particular the stripe 342 consisting of the individual storage blocks 302 of the disk extent 0 in the RAID block 210. Therefore, the storage block P in the stripe 342-0, which is used for storing the parity information, is now in a failed status. If the storage system 100 receives a request 520 to write data and decides to write the data to the stripe 342-0, the data will be divided into a plurality of data blocks 521 to 524. These data blocks 521 to 524 are directly written into the storage blocks D0 to D3. Since the storage block P storing the parity information fails, no parity information of these data will be generated.

In the example of FIG. 5D, it is assumed that an offline disk affects a storage block of a stripe in which data is stored. For example, similarly to the examples of FIGS. 5A and 5B, the storage disk 142 in which the disk extent 3 is located is offline, and thus the storage block D1 storing data in the stripe 342-0 is in a failed status (or a degraded status). At this time, it is required to generate parity information 525 based on the data blocks 521 to 524 to be written, write the parity information 525 to the storage block P, and then write the data blocks 521, 523, and 524 to the storage blocks D0, D2 and D3 that are not failed. Thus, although the data block 522 cannot be written to the failed storage block D1, due to the presence of the parity information 525, it is still possible to reconstruct the data block 525 based on the data blocks 521, 523, and 524 and the parity information 525 when it is needed to subsequently read the data. However, in the degraded status, the generation of the parity information before the data is written also requires computational resources consumption.

In the conventional solution, the storage system always writes data sequentially to the RAID stripe in the order of the logical space address, either in a normal status or in a degraded status due to offline storage disks. This will result in a drop of I/O access performance in many cases.

By studying I/O reads and writes in a RAID-based storage system in a degraded status, the inventors have recognized that if a storage block of a stripe affected by an offline disk is a block for storing parity information, writing data to this stripe will not cause additional computational consumption. In addition, subsequent data reads of the stripe will not cause additional I/O bandwidth consumption and computational consumption. The inventors further recognized that when one or more storage disks in the storage system are offline, the storage blocks allocated for storing parity information in stripes of a certain percentage are from the offline disk. For example, in the type of RAID 5-based RAID blocks illustrated in FIG. 4, if one storage disk is offline, about 1/5 of storage blocks for storing parity information in the stripe are from the offline disks. For the entire RAID, this ratio is also about 1/5. This ratio may vary depending on the RAID type and the layout of the storage blocks in the stripe. For example, for RAID 6 type RAID, if parity information is placed cyclically between multiple disk extents, the ratio of the stripes used to store parity information from offline disks is about 2/6 because there are two in six blocks for storing parity information of each stripe.

Based at least on the above awareness, the present disclosure proposes an improved storage management solution in a RAID based storage system. According to the solution, when data is to write to the RAID, if there is an offline disk in a plurality of storage disks over which the RAID is built, instead of sequentially writing to stripes, a specific stripe is determined from the plurality of stripes of the RAID where the specific stripe has a storage block allocated from the offline disk for storing parity information. Data is then written to that specific stripe. In this way, the performance of data write can be improved in presence of an offline disk, and the computational consumption can be reduced. In addition, the performance of subsequent data read can be improved potentially, including reduction of computational consumption and I/O bandwidth consumption both.

Figure 6:
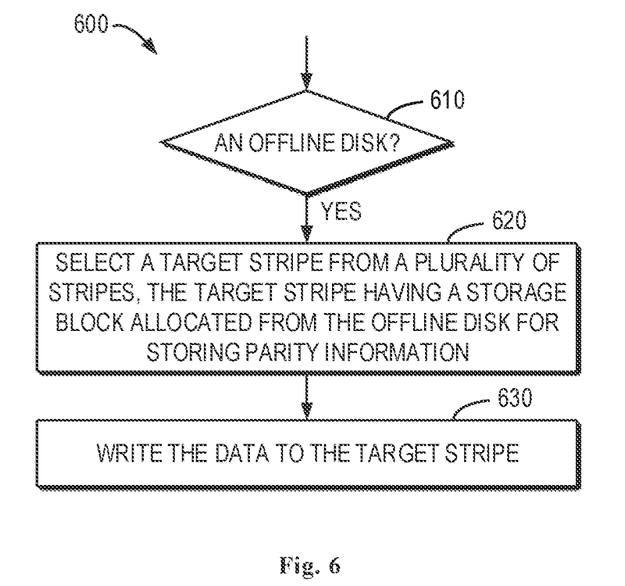
FIG. 6 is a schematic flowchart illustrating a method of storage management according to an embodiment of the present disclosure.

FIG. 6 is a schematic flowchart illustrating a method of storage management 600 according to an embodiment of the present disclosure. In some embodiments, the method 600 can be implemented at the storage system 100, more particularly, at the mapper 120. Thus, the method 600 is implemented, for example, by the storage system 100 or a separate computing device that implements the mapper 120. For convenience of description, reference will be made hereinafter to the storage system architecture and the detailed structure of the RAID in FIGS. 1 to 4. However, it would be appreciated that the method 600 may not be limited to the applications illustrated in FIGS. 1-4, but can be applied to a RAID of any other suitable type.

At block 610, in response to a request to write data to the RAID 130 (also referred to as a "write request"), the mapper 120 determines whether there is an offline disk in a plurality of storage disks 142 constituting the RAID 130. The RAID 130 includes a plurality of stripes 342. In the above FIG. 2 and similar embodiments, the RAID 130 can dynamically increase its capacity in units of RAID blocks, each RAID block including a certain number of stripes 342. In some embodiments, the RAID 130 may include a predetermined capacity and is divided into a predetermined number of stripes. Embodiments of the present disclosure have no limitations to the type of the RAID 130. Regardless of RAID type, each stripe 342 in the RAID 130 typically includes a plurality of respective storage blocks 302 that are divided from a plurality of storage disks 142. In other words, each stripe 342 is allocated with storage blocks 302 across a plurality of storage disks 142.

In some embodiments, after the storage system 100 receives the request to write data, the data may not be immediately written to the physical storage space but is first cached into a cache device. The mapper 120 may determine when to write the data to the stripes 342 in the RAID 130 according to a predetermined data flushing mechanism. The mapper 120 may perform data write in units of stripes. In some embodiments, the mapper 120 may determine whether there is an offline disk in the plurality of storage disks 142 when the data to be written is actually written to the RAID 130.

In some cases, one or more of the storage disks 142 that form the RAID 130 will be offline due to a failure or being pulled out. Such storage disk 142 is also referred to as an offline disk 142. Offline disks are unavailable for I/O access. Thus, the storage blocks 302 of the offline disk 142 also enter an offline status. At this time, the RAID block 210 composed of a plurality of stripes 342 or the respective stripes 342 all enter a degraded status. In the degraded status, the stripes 342 can still be used for I/O access, such as reading and/or writing data.

In some embodiments, in determining an offline disk, the mapper 120 may obtain metadata associated with the RAID 130 and determine, based on the metadata, whether the current writable RAID block 210 in the RAID 130 is in a degraded status (i.e., whether one or more storage blocks 302 are from the disk extent 202 of the offline disk 142). The currently writable RAID block 210 that can be written refers to the available storage space currently dynamically allocated to the RAID 130. As mentioned above, the RAID block 210 includes a predetermined number of stripes 342 in the RAID 130. In some embodiments, the metadata may also indicate which storage disk 142 is in the offline status.

If it is determined that there is an offline disk, at block 620, the mapper 120 selects a target stripe 342 from the plurality of stripes 342, where the target stripe 342 has a storage block allocated from the offline disk 142 for storing parity information. At block 630, the mapper 120 writes the data to the target stripe 342. That is, according to embodiments of the present disclosure, in the case where an offline disk exists (for example, in a degraded status of the RAID 130), upon data writing, the data is preferably written to a stripe having a storage block allocated from the offline disk for storing parity information. If the data is written to the target stripe, there is no need to generate parity information of the data, but to directly write the data into the storage blocks of the target stripe except for a storage block(s) from the offline disk, which is similar to the scenario illustrated by the example FIG. 5C.

Such data write can reduce computational consumption by avoiding generation of parity information. In addition, it potentially improves the performance of subsequent reading of such data. For example, after writing the data to the target stripe 342, if a request to read at least one portion of the data is received, the mapper 120 can directly read the requested data from the target stripe. This is because when data is written, all data is written to the storage blocks that are allocated for storing data, but not to the storage block from the offline disks (because the storage block is allocated in the target stripe for storing parity information), the corresponding part of the data can be obtained directly from the respective storage blocks when data is read. This is similar to the scenario illustrated with respect to the example of FIG. 5A. Compared to the scenario in which storage blocks from the offline disk are used to store data (e.g., the scenario as illustrated in the example of FIG. 5B), it is possible to effectively reduce I/O read and data reconstruction calculations required to be performed to rebuild the data.

The determination of the target stripe from the RAID 130 will be described in detail below. In a RAID block-based embodiment, it is first determined a writable RAID block 210 in the RAID 130. Free stripes 342 are then determined from the RAID block 210 and the target stripe is selected from the free stripes 342. A free stripe refers to a stripe that has not been used to store data.

In some embodiments, in order to locate the target stripe, the mapper 120 may determine which (free) stripes are allocated from the offline disk 142 based on the stripe layout information of the RAID 130 and the determined relative position of the offline disk 142 in the plurality of storage disks 142 that constitute the RAID 130. The stripe layout information of RAID 130 is used to indicate how stripes 342 are distributed across the storage disks, particularly how they are distributed across a single RAID block 210. Such stripe layout information may include, for example, used capacity of the RAID block 210, per-stripe capacity, and a stripe width. The stripe width refers to the number of stripes that can be read or written concurrently, which is equal to the number of physical hard drives in the RAID. The stripe width is related to the type of the RAID 130. For example, for a RAID 130 of type of RAID 5, the width of the stripe 342 is five.

The stripe layout information further includes a distribution pattern of storage blocks for storing parity information among respective stripes. In some embodiments, the storage blocks for parity information in the plurality of stripes 342 are circulated among the plurality of storage disks 142 (or among the plurality of disk extents 202 in the RAID block 210), as shown in FIG. 4. In other embodiments, storage blocks for parity information in different stripes 342 may circulate in other predetermined distribution pattern. Such distribution pattern may be allowable as long as the distribution across the plurality of storage disks 142 follows a predetermined rule instead of random distribution.

Figure 7:
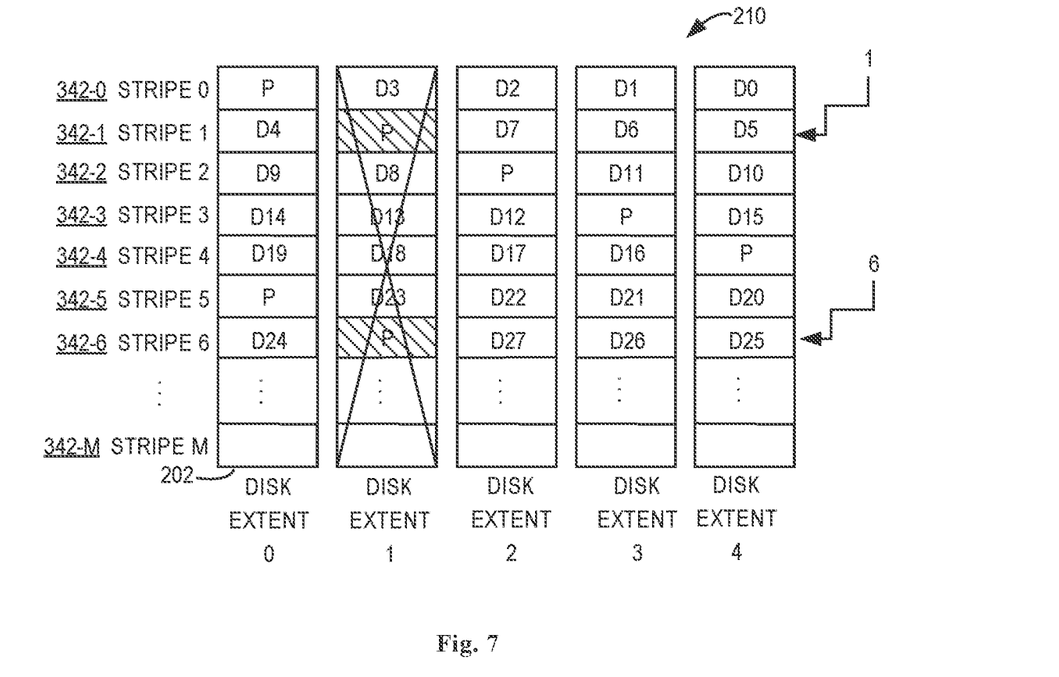
FIG. 7 is a schematic diagram illustrating determination of a storage block allocated for storing parity information from an offline disk within a single RAID block 210 under a degraded status in accordance with an embodiment of the present disclosure.

FIG. 7 is an example determining, within a single RAID block 210 under a degraded status, a stripe having a storage block allocated for storing parity information from an offline disk. In the example of FIG. 7, the storage blocks for parity information in a plurality of stripes are distributed in a cyclic manner. It is assumed that the storage disk 142 where the disk extent 1 of the RAID block 210 is located is offline, and thus storage blocks in the disk extent 1 are offline and unavailable for data read and write.

The mapper 120 may determine a location of a storage block for storing parity information in the first free stripe of the RAID block 210 based on capacity used by the RAID block 210, capacity of the stripe 342, and the stripe width. In one example, the location (represented as "Ppos") may be calculated by the following: Ppos=(Cap_b/Cap_plb) % Width, where Cap_b represents the capacity used by the RAID block 210 (assuming in units of a block), Cap_plb represents per-stripe capacity (also assuming in units of a storage block), Width represents stripe width, and % represents a remainder operation. In the example of FIG. 7, it is assumed that capacity used by the RAID block 210 is zero blocks (i.e., no data has been written in the RAID block 210), the unit stripe capacity is five blocks, and the width is 5. The location of the storage block for storing the parity information in the first free stripe is calculated as Ppos=(0/5) % 5=0.

The mapper 120 may continue to determine within the RAID block 210 an index of the first free stripe having its storage block allocated for storing the parity information from the offline disk 142, based on the distribution pattern of the storage blocks for storing the parity information in the stripe and the relative position of the offline disk 142 among the plurality of storage disks 142 constituting the RAID 130. It is noted that in the RAID block 210, the relative position of the offline disk 142 among the plurality of storage disks 142 constituting the RAID 130 is the same as that of the disk extent of the offline disk among the plurality of disk extents constituting the RAID block 210. In some embodiments, this relative position may be determined by an index number of the disk extent after indexing the plurality of extents in order. Here, it is assumed that stripes in the RAID block 210 are indexed sequentially from 0, and the disk extents from the plurality of storage disks 142 are also indexed sequentially from 0.

In one example, the index (represented as "Pdeg") of the first free stripe having its storage block for storing parity information located on the offline disk 142 can be calculated by the following: Pdeg=(Width−Ppos+I) % Width, where I represents the relative position of the offline disk 142 among the plurality of storage disks 142 constituting the RAID 130, and I may be valued from 0 to a value resulting from reducing one from the stripe width (for example, the value may be 5−1=4). In the example of FIG. 7, since the storage disk 142 in which the disk extent 1 is located is offline, I=1. Here, the index of the first free stripe having its storage block for storing parity information located at the offline disk 142 may be calculated as Pdeg=(5-0+1) % 5=1. That is, the first free stripe in the RAID block 210, which has its storage block for storing parity information located at the offline disk 142, is the stripe 1 (i.e., the stripe 342-1).

Indices of all the free stripes of the RAID block 210 having their the storage blocks for storing parity information located on the offline disk 142 may be determined based on the determined first stripe, the number of stripes of the RAID block 210, and the stripe width. In one example, an index of a free stripe having its storage block for storing parity information located on the offline disk 142 is determined as: Pdeg_m=Pdeg+m*Width, where m can has a minimum value of 0, and then Pdeg_m represents an index of the first stripe having its storage block for storing parity information located at the offline disk 142; the maximum value of m is M/5, where M represents the total number of stripes in the RAID block 210. Accordingly, if the index of the first stripe having its storage block for storing parity information located at the offline disk 142 is Pdeg=1, the index of the next stripe having its storage block for storing parity information located at the offline disk 142 is Pdeg_1=1+1*5=6, i.e., the stripe 342-6 in FIG. 7. Similarly, the index of the last stripe is Pdeg_max=1+M/5*5.

Thus, the mapper 120 may determine at least one free stripe from all the free stripes, where a storage block for storing the parity information in the determined free stripes is from the offline disk. The mapper 120 may select one of the determined free stripes for writing the data that is currently pending for writing. In an example, the mapper 120 may select in sequence the first free stripe as the target stripe. In other examples, the mapper 120 may randomly select an available stripe as the target stripe. Embodiments of the present disclosure are not limited in this regard.

It would be appreciated that the approach described above is merely an example for locating the stripes having their storage block for storing parity information located at the offline disk. In other embodiments, once the layout of the stripes in the RAID and the specific location of the offline disk are determined, there may be any other approaches to determine, within the RAID 130 or the RAID block 210, one or more stripes having their storage blocks allocated for storing parity information from the offline disk. The scope of the embodiments of the present disclosure is not limited in this regard.

Although the storage system with a type of RAID 5 is used as an example for discussion in the above embodiments and the discussion is related to the case where there is only a single offline disk, in other cases, depending on the RAID type, there may be a plurality of storage blocks in each stripe for storing parity information. In such embodiment, if a plurality of storage disks are offline, it is possible to prioritize writing of the stripes having a plurality of blocks allocated for storing parity information from the offline disks in order to improve read and write performance.

In some embodiments, for subsequent data write, the mapper 120 may continually prioritize writes to its available blocks for storing parity information from the available stripes of the offline disk in a similar manner until there are no stripes in available storage space in the RAID 130 that have their storage blocks for storing parity information allocated from the current offline disks.

If all of the storage disks 142 used to build the RAID 130 are in normal working status, or if all the stripes having their storage block for storing parity information from the offline disks have been written with data in the presence of the offline disk 142, the mapper 120 can select an available stripe in order to perform data write.

Figure 8:
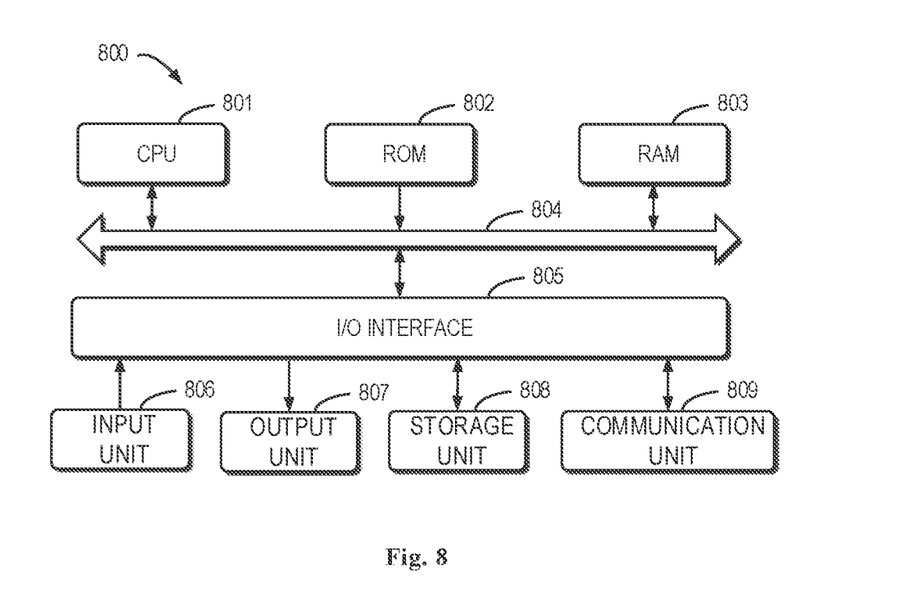
FIG. 8 is a schematic block diagram illustrating a device that is suitable for implementing embodiments of the present disclosure.

FIG. 8 is a block diagram illustrating a device 800 that is suitable for implementing embodiments of the present disclosure. As shown in FIG. 8, the device 800 includes a central processing unit (CPU) 801 which can perform various suitable actions and processing according to computer program instructions stored in a read-only memory (ROM) 802 or loaded to a random access memory (RAM) 803 from a storage section 808. The RAM 803 can also store various programs and data required by the operations of the device 800. The CPU 801, ROM 802 and RAM 803 are connected to each other via a bus 804. An input/output (I/O) interface 805 is also connected to the bus 804.

The following components in the device 800 are connected to the I/O interface 805: an input 806 such as a keyboard, a mouse and the like; an output unit 807 including various kinds of displays and a loudspeaker, etc.; a memory unit 808 including a magnetic disk, an optical disk, and etc.; a communication unit 809 including a network card, a modem, and a wireless communication transceiver, etc. The communication unit 809 allows the device 800 to exchange information/data with other devices through a computer network such as the Internet and/or various kinds of telecommunications networks.

Various processes and processing described above, such as the method 600, can also be performed by the processing unit 801. For example, in some embodiments, the method 600 may be implemented as a computer software program that is tangibly embodied on a machine readable medium, e.g., the storage unit 808. In some embodiments, part or all of the computer programs may be loaded and/or mounted onto the device 800 via the ROM 802 and/or the communication unit 809. When the computer program is loaded to the RAM 803 and executed by the CPU 801, one or more steps of the method 600 as described above may be executed.

As used herein, the term "comprise" and its variants are to be read as open-ended terms that mean "comprise, but is not limited to." The term "based on" is to be read as "based at least in part on." The terms "one example embodiment" and "an example embodiment" are to be read as "at least one example embodiment." The terms "first", "second" and the like may refer to different or the same objects. Other definitions, either explicit or implicit, may be included below.

As used herein, the term "determining" encompasses a wide variety of actions. For example, "determining" can include computing, computing, processing, deriving, investigating, looking up (e.g., looking up in a table, database, or another data structure), ascertaining, and the like. Further, "determining" can include receiving (e.g., receiving information), accessing (e.g., accessing data in memory), and the like. Further, "determining" may include parsing, selecting, selecting, establishing, and the like.

It will be noted that the embodiments of the present disclosure can be implemented in software, hardware, or a combination thereof. The hardware part can be implemented by special-purpose logic; the software part can be stored in a memory and executed by a suitable instruction execution system such as microprocessors or special-purpose hardware. Those ordinary skilled in the art can understand that the above method and system may be implemented with computer executable instructions and/or in processor-controlled code, for example, the code provided on a carrier medium such as an optical or electronic signal bearer.

Further, although operations of the present methods are described in a particular order in the drawings, it does not require or imply that these operations are necessarily performed according to this particular sequence, or a desired outcome can only be achieved by performing all shown operations. By contrast, the execution order for the steps as depicted in the flowcharts may be varied. Alternatively, or in addition, some steps may be omitted, a plurality of steps may be merged into one step, or a step may be divided into a plurality of steps for execution. In practice, according to the embodiments of the present invention, the features and functions of two or more units described above may be embodied in one unit. In turn, the features and functions of one unit described above may be further embodied in more units.

Although the present disclosure has been described with reference to various embodiments, it would be appreciated that the present disclosure is not limited to the disclosed embodiments. The present disclosure is intended to cover various modifications and equivalent arrangements included in the spirit and scope of certain example embodiments disclosed herein.

We claim:

1. A method of storage management, comprising:
   in response to a request to write data to a redundant array of independent disks (RAID), determining whether there is an offline disk in a plurality of storage disks constituting the RAID, the RAID comprising a plurality of stripes, each of the plurality of stripes comprising a plurality of storage blocks divided from the plurality of storage disks;
   in response to determining that there is an offline disk in the plurality of storage disks, selecting a target stripe from the plurality of stripes, the target stripe having a storage block allocated from the offline disk for storing parity information; and
   writing the data to the target stripe.

2. The method of claim 1, wherein selecting the target stripe comprises:
   determining a writable RAID storage block from the RAID, the RAID storage block comprising a predetermined number of stripes of the plurality of stripes;
   determining free stripes from the RAID storage block; and
   selecting the target stripe from the free stripes.

3. The method of claim 2, wherein selecting the target stripe from the free stripes comprises:
   determining at least one of the free stripes that has a storage block allocated from the offline disk for storing parity information, based on stripe layout information of the RAID and a relative position of the offline disk among the plurality of storage disks; and
   selecting the target stripe from the at least one determined free stripe.

4. The method of claim 3, wherein the stripe layout information comprises used capacity of the RAID storage block, per-stripe capacity, a stripe width, and a distribution pattern of storage blocks for storing parity information among respective stripes.

5. The method of claim 1, wherein writing the data to the target stripe comprises:
   writing the data to other storage blocks in the target stripe than the storage block from the offline disk, without generating parity information of the data.

6. The method of claim 1, further comprising:
   in response to a further request to read at least one portion of the data, directly reading the at least one portion of the data from the target stripe.

7. An electronic device, comprising:
   at least one processor; and
   at least one memory storing computer program instructions, the at least one memory and the computer program instructions being configured, with the at least one processor, to cause the electronic device to perform acts comprising:
in response to a request to write data to a redundant array of independent disks (RAID), determining whether there is an offline disk in a plurality of storage disks constituting the RAID, the RAID comprising a plurality of stripes each comprising a plurality of storage blocks divided from the plurality of storage disks;
in response to determining that there is an offline disk in the plurality of storage disks, selecting a target stripe from the plurality of stripes, the target stripe having a storage block allocated from the offline disk for storing parity information; and
writing the data to the target stripe.

8. The device of claim 7, wherein selecting the target stripe comprises:
determining a writable RAID storage block from the RAID, the RAID storage block comprising a predetermined number of stripes of the plurality of stripes;
determining free stripes from the RAID storage block; and
selecting the target stripe from the free stripes.

9. The device of claim 8, wherein selecting the target stripe from the free stripes comprises:
determining at least one of the free stripes that has a storage block allocated from the offline disk for storing parity information, based on stripe layout information of the RAID and a relative position of the offline disk among the plurality of storage disks; and
selecting the target stripe from the at least one determined free stripe.

10. The device of claim 9, wherein the stripe layout information comprises used capacity of the RAID storage block, per-stripe capacity, a stripe width, and a distribution pattern of storage blocks for storing parity information among respective stripes.

11. The device of claim 7, wherein writing the data to the target stripe comprises:
writing the data to other storage blocks in the target stripe than the storage block from the offline disk, without generating parity information of the data.

12. The device of claim 7, wherein the acts further comprise:
in response to a further request to read at least one portion of the data, directly reading the at least one portion of the data from the target stripe.

13. A computer program product being tangibly stored on a non-transitory computer readable medium and comprising machine executable instructions, the machine executable instructions, when executed, causing a device to:
in response to a request to write data to a redundant array of independent disks (RAID), determine whether there is an offline disk in a plurality of storage disks constituting the RAID, the RAID comprising a plurality of stripes each comprising a plurality of storage blocks divided from the plurality of storage disks;
in response to determining that there is an offline disk in the plurality of storage disks, select a target stripe from the plurality of stripes, the target stripe having a storage block allocated from the offline disk for storing parity information; and
write the data to the target stripe.

14. The computer program product of claim 13, wherein the machine executable instructions, when executed, cause the device to:
determine a writable RAID storage block from the RAID, the RAID storage block comprising a predetermined number of stripes of the plurality of stripes;
determine free stripes from the RAID storage block; and
select the target stripe from the free stripes.

15. The computer program product of claim 14, wherein the machine executable instructions, when executed, cause the device to:
determine at least one of the free stripes that has a storage block allocated from the offline disk for storing parity information, based on stripe layout information of the RAID and a relative position of the offline disk among the plurality of storage disks; and
select the target stripe from the at least one determined free stripe.

16. The computer program product of claim 15, wherein the stripe layout information comprises used capacity of the RAID storage block, per-stripe capacity, a stripe width, and a distribution pattern of storage blocks for storing parity information among respective stripes.

17. The computer program product of claim 13, wherein the machine executable instructions, when executed, cause the device to:
write the data to other storage blocks in the target stripe than the storage block from the offline disk, without generating parity information of the data.

18. The computer program product of claim 13, wherein the machine executable instructions, when executed, further cause the device to:
in response to a further request to read at least one portion of the data, directly read the at least one portion of the data from the target stripe.

* * * * *